United States Patent
Mergener et al.

(10) Patent No.: US 9,400,517 B2
(45) Date of Patent: Jul. 26, 2016

(54) SNUBBER CIRCUIT FOR A HAND HELD POWER TOOL

(71) Applicant: Milwaukee Electric Tool Corporation, Brookfield, WI (US)

(72) Inventors: Matthew J. Mergener, Germantown, WI (US); Matthew P. Wycklendt, Delafield, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 360 days.

(21) Appl. No.: 14/078,892

(22) Filed: Nov. 13, 2013

(65) Prior Publication Data

US 2014/0132079 A1    May 15, 2014

Related U.S. Application Data

(60) Provisional application No. 61/725,765, filed on Nov. 13, 2012.

(51) Int. Cl.
| | |
|---|---|
| *H02M 3/18* | (2006.01) |
| *G05F 3/10* | (2006.01) |
| *H02M 1/34* | (2007.01) |
| *B25D 17/00* | (2006.01) |
| *H02P 6/08* | (2016.01) |
| *H02J 7/32* | (2006.01) |

(52) U.S. Cl.
CPC . *G05F 3/10* (2013.01); *H02M 1/34* (2013.01); *B25D 17/00* (2013.01); *H02J 7/32* (2013.01); *H02P 6/085* (2013.01)

(58) Field of Classification Search
CPC .......... G05F 3/10; H02M 1/34; B25D 17/00; H02J 7/32; H02P 6/085
See application file for complete search history.

(56) References Cited

U.S. PATENT DOCUMENTS

| | | | | |
|---|---|---|---|---|
| 5,640,071 A | * | 6/1997 | Malaspina ................ | H02J 7/14 318/139 |
| 2008/0174269 A1 | * | 7/2008 | DeRome ............... | H02J 7/0045 320/110 |
| 2009/0108806 A1 | * | 4/2009 | Takano ..................... | B25F 5/02 320/112 |
| 2010/0265740 A1 | * | 10/2010 | Zargari ................... | H02M 1/08 363/17 |
| 2012/0049834 A1 | * | 3/2012 | Pommerenke .......... | H02M 1/34 323/311 |

FOREIGN PATENT DOCUMENTS

JP    2000102286 A  *  4/2000

* cited by examiner

*Primary Examiner* — Daniel Cavallari
(74) *Attorney, Agent, or Firm* — Michael Best & Friedrich LLP

(57) ABSTRACT

A hand held power tool including a trigger, a motor, an output unit driven by the motor, a switch bridge, and a snubber circuit. The switch bridge is operable to selectively provide power to the motor to drive the output unit in response to activation of the trigger. The snubber circuit is electrically connected in parallel across the switch bridge. The snubber circuit is operable to store energy when power is being provided to the motor, and release the energy when power is not being provided to the motor.

25 Claims, 13 Drawing Sheets

SNUBBER CIRCUIT FOR A HAND HELD POWER TOOL

RELATED APPLICATIONS

This application claims priority to U.S. Provisional Patent Application No. 61/725,765, filed on Nov. 13, 2012, the entire content of which is hereby incorporated by reference.

FIELD OF THE INVENTION

The present invention relates to a snubber circuit for a hand held power tool.

BACKGROUND

Power tools have benefitted from improvements in battery technology and performance. In some instances, more than 100 A of current may be drawn from the battery pack of a power tool over a short period of time. While these power levels help to generate high torques and performance similar to that of AC power tools, they also place stress on the power electronics of the power tool.

SUMMARY

The magnetic fields produced by such currents, which are generated around all wires, current carrying elements, and within the motor, are one of the major contributors to the stress placed on the power electronics of the power tool. When a power device, such as a FET, switches on or off, the energy contained in the generated magnetic fields is stored or released. This energy is roughly equal to $\frac{1}{2}*L*I^2$. Thus, as the current increases, energy builds up very rapidly as the square of the current. When current to the motor is turned off, or magnetic field energy is released, the energy must be dissipated somewhere. This energy can be wasted as heat within the wires or semiconductors, or recovered as useful energy. Usually, semiconductors (e.g., switching FETs), which have relatively small physical areas, absorb most of the magnetic field energy. When the semiconductors absorb most of this released energy, the semiconductors can experience what are known as "avalanche" events, which can result in the semiconductors rapidly heating up and failing.

For most of the wires in a power tool system, as well as battery cell inductance (e.g., battery cells are complex wound elements with inductive properties), there is associated "unclamped" inductance. Unclamped inductance does not have a diode or another path to return corresponding energy to the power tool system ground (e.g., B-potential). By contrast, the inductance of a motor is "clamped" inductance because the motor includes diodes around it as part of a switching bridge configuration. The energy from the motor inductance is usually dissipated within the switching bridge electronics and the field coils of the motor. Most of this energy is dissipated within the field coils of the motor because of their large physical areas, compared to the small physical areas of the switching bridge electronics. Although clamped inductance is a concern in power tools, it can generally be managed using standard design techniques.

If the "unclamped" inductance and the associated energy is not controlled, a large voltage pulse is generated when turning off of the FETs that results in an avalanche event as described above. The unclamped inductance is a serious issue for hand held power tools and differs from industrial controls (i.e., non-power tool controls) in a variety of ways. In most industrial controls and power electronics, unlike power tools, the effects of these magnetic fields and unclamped inductances are controlled by adding a large capacitance across the $V_{BRIDGE}+$ and $V_{BRIDGE}-$ nodes of the switching elements. This allows the energy from the unclamped inductance a path back to a power supply and to be filtered or smoothed out by temporarily storing the energy.

Unlike the industrial controls described above, power tools have high currents, low impedances, low resistances, and tight space requirements. Therefore, capacitors with large enough capacitance to control the effects of the magnetic fields and unclamped inductances in industrial controls are too large to meet the tight space requirements of power tools. Additionally, power tools typically need to run in a speed control mode that involves providing PWM power to the motor. This chopping on and off of power results in the frequent storage and release of magnetic field energies and, in some instances, can represent 3-5 percent of total energy losses in the power tool system. These energy losses are proportional to the switching frequency of the PWM chopping rate. However, low chopping frequencies make an audible noise and are not feasible in some electronically commutated brushless direct-current ("BLDC") motors. As such, a higher chopping frequency is preferred in power tools and additional energy losses, due to the high chopping frequency, must be accounted for in other ways.

In one embodiment, the invention provides a hand held power tool including a trigger, a motor, an output unit driven by the motor, a switch bridge, and a snubber circuit. The switch bridge is operable to selectively provide power to the motor to drive the output unit in response to activation of the trigger. The snubber circuit is electrically connected in parallel across the switch bridge. The snubber circuit is operable to store energy when power is being provided to the motor, and release the energy when power is not being provided to the motor.

In another embodiment the invention provides a method of controlling unclamped inductance in a power tool. The power tool includes a motor, an output unit driven by the motor, a switch bridge, and a snubber circuit. The method comprises: receiving power at the switch bridge; selectively providing power to the motor; storing energy in the snubber circuit when power is being provided to the motor; and releasing the energy stored in the scrubber circuit when power is not being provided to the motor.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
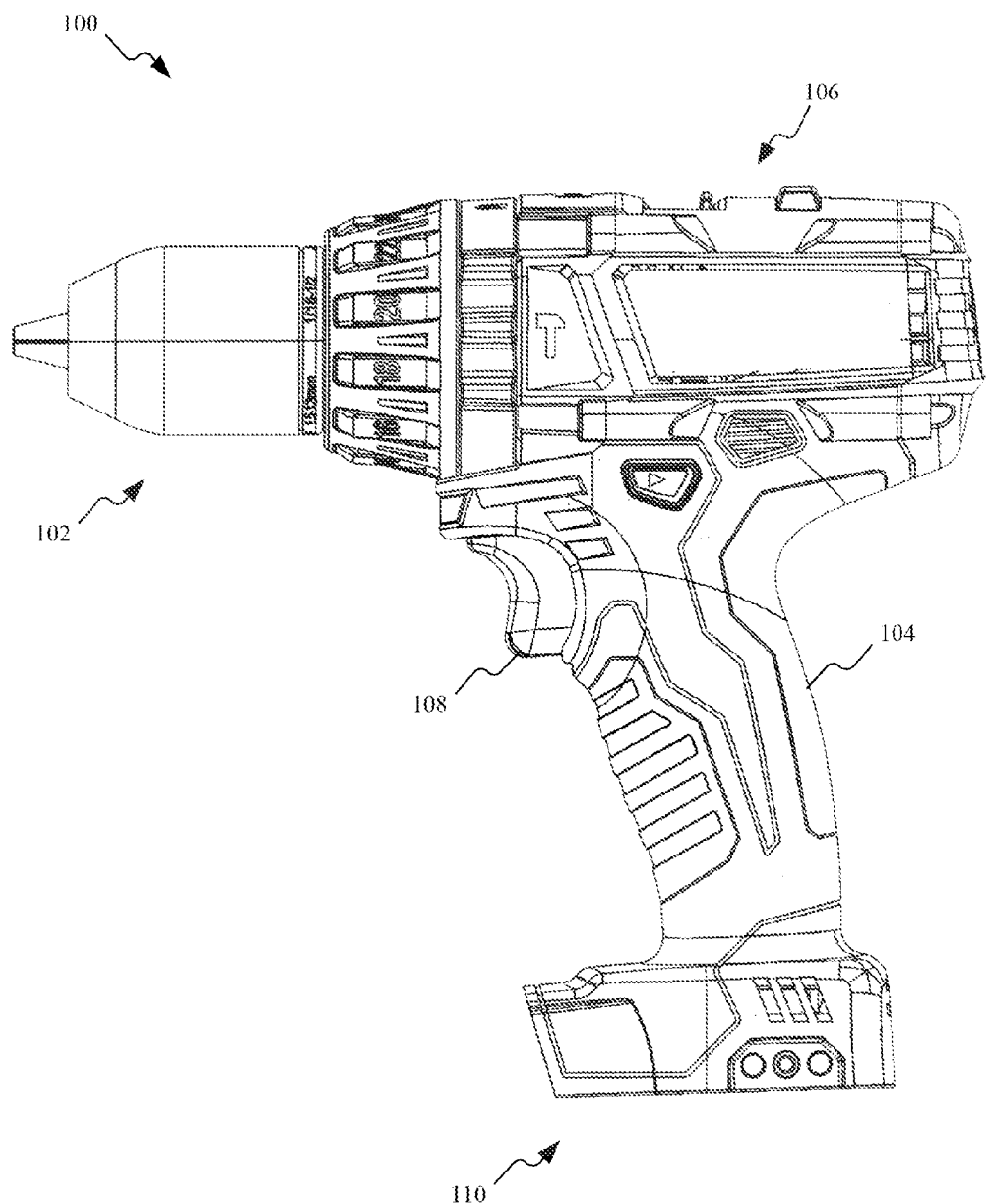
FIG. 1 illustrates a hammer drill/driver according to an embodiment of the invention.
Figure 2:
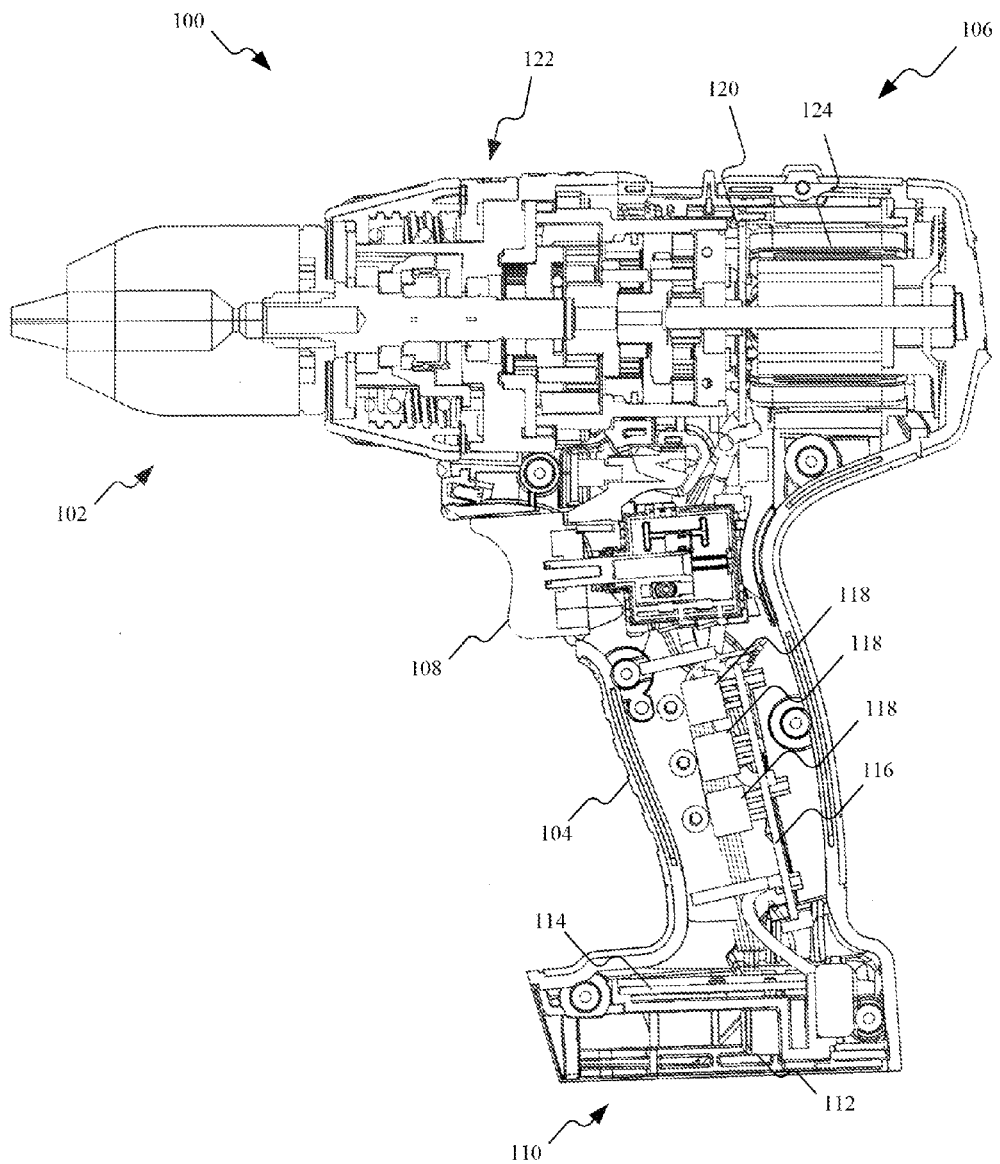
FIG. 2 is a cross-sectional view of the hammer drill/driver of FIG. 1.

FIGS. 1-8 illustrate hand held power tools that incorporate a snubber circuit according to embodiments of the invention. FIG. 1 illustrates a hammer drill/driver 100 (herein a hammer drill 100) having an output unit 102, handle 104, motor housing portion 106, trigger (e.g., a user-activated switch) 108, and a battery interface 110. FIG. 2 illustrates a cross section of the hammer drill 100. The hammer drill 100 further includes battery terminals 112, a control printed circuit board (PCB) 114, a field effect transistor (FET) PCB 116 including FETs 118, and a Hall sensor PCB 120. The hammer drill 100 further includes a hammer drive mechanism 122 and a motor 124 (e.g., a brushless direct current ["BLDC"] motor).

Figure 9:
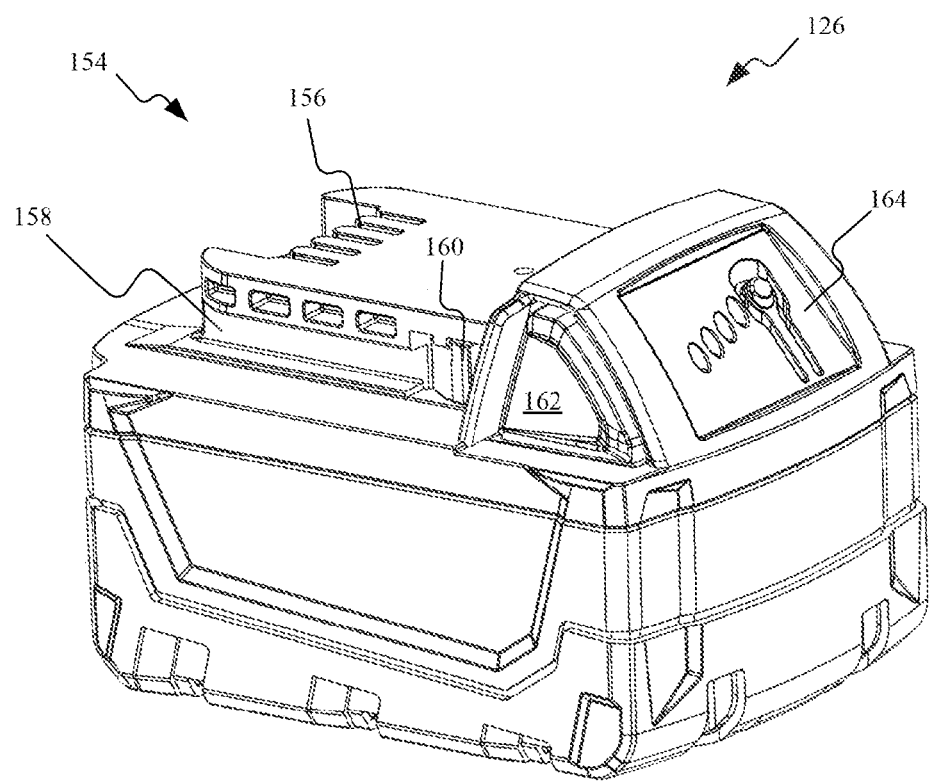
FIG. 9 illustrates a battery pack for powering a power tool.

The battery interface 110, particularly the battery terminals 112, connect to terminals of a power tool battery pack 126 (see FIG. 9). Thus, the battery pack 126 is electrically and mechanically coupled to the hammer drill 100. The trigger 108 allows a user to selectively control driving of the output unit 102 using power from the battery pack 126. When depressed, the trigger 108 sends a signal to the control PCB 114. In response, the control PCB 114 controls the switching of the FETs 118, e.g., with a pulse width modulated (PWM) signal, to selectively drive the motor 124 with power from the battery pack 126. Hall sensors of the Hall sensor PCB 120 detect the rotational position, speed, and/or acceleration of the motor 124 and output this motor information to the control PCB 114. In turn, the control PCB 114 uses the motor information to control the switching of the FETs 118. The rotation output of the motor 124 drives the drive mechanism 122, which, in turn, translates a force to the output unit 102 for producing a mechanical output.

Figure 3:
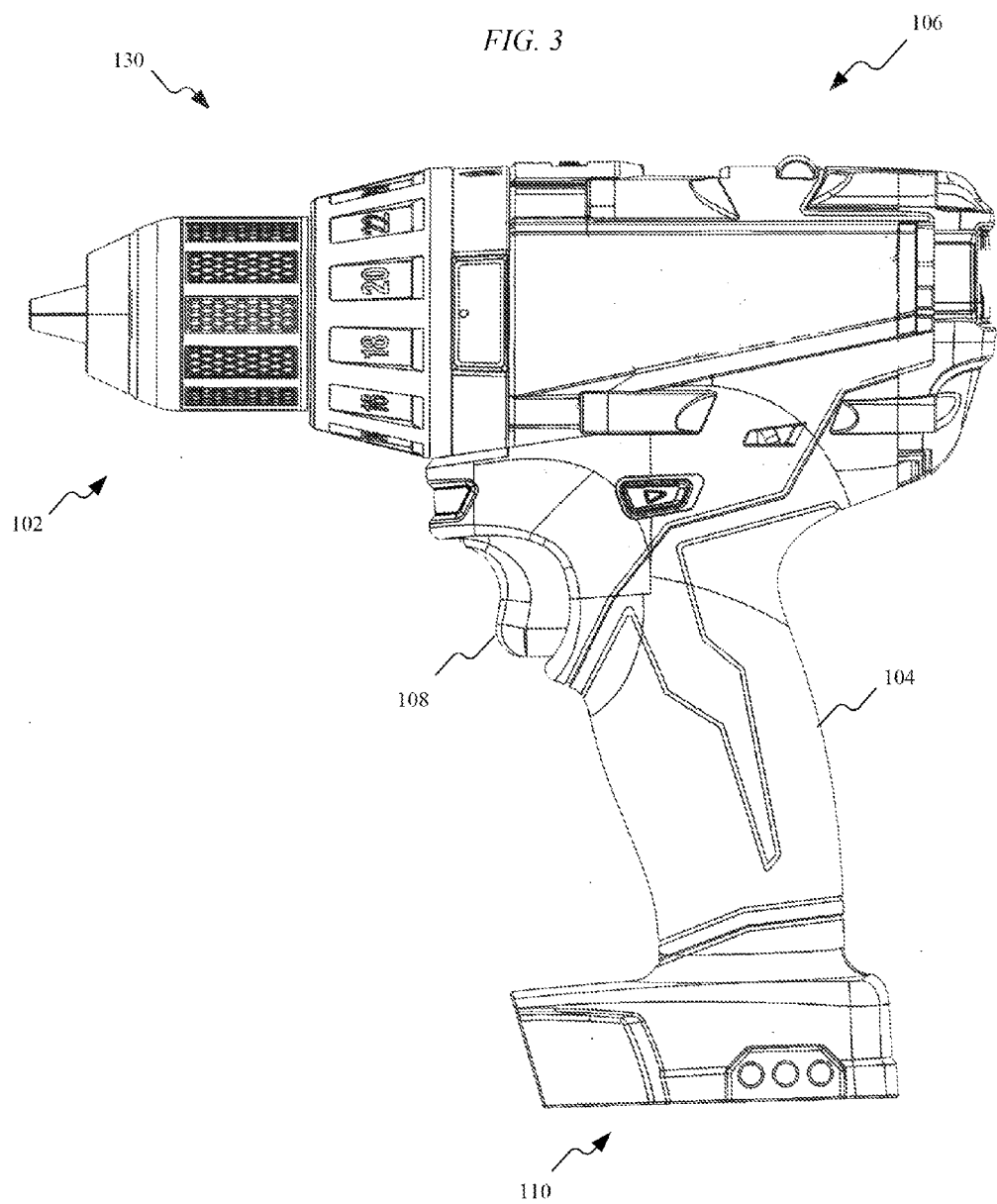
FIG. 3 illustrates a drill/driver according to an embodiment of the invention.
Figure 4:
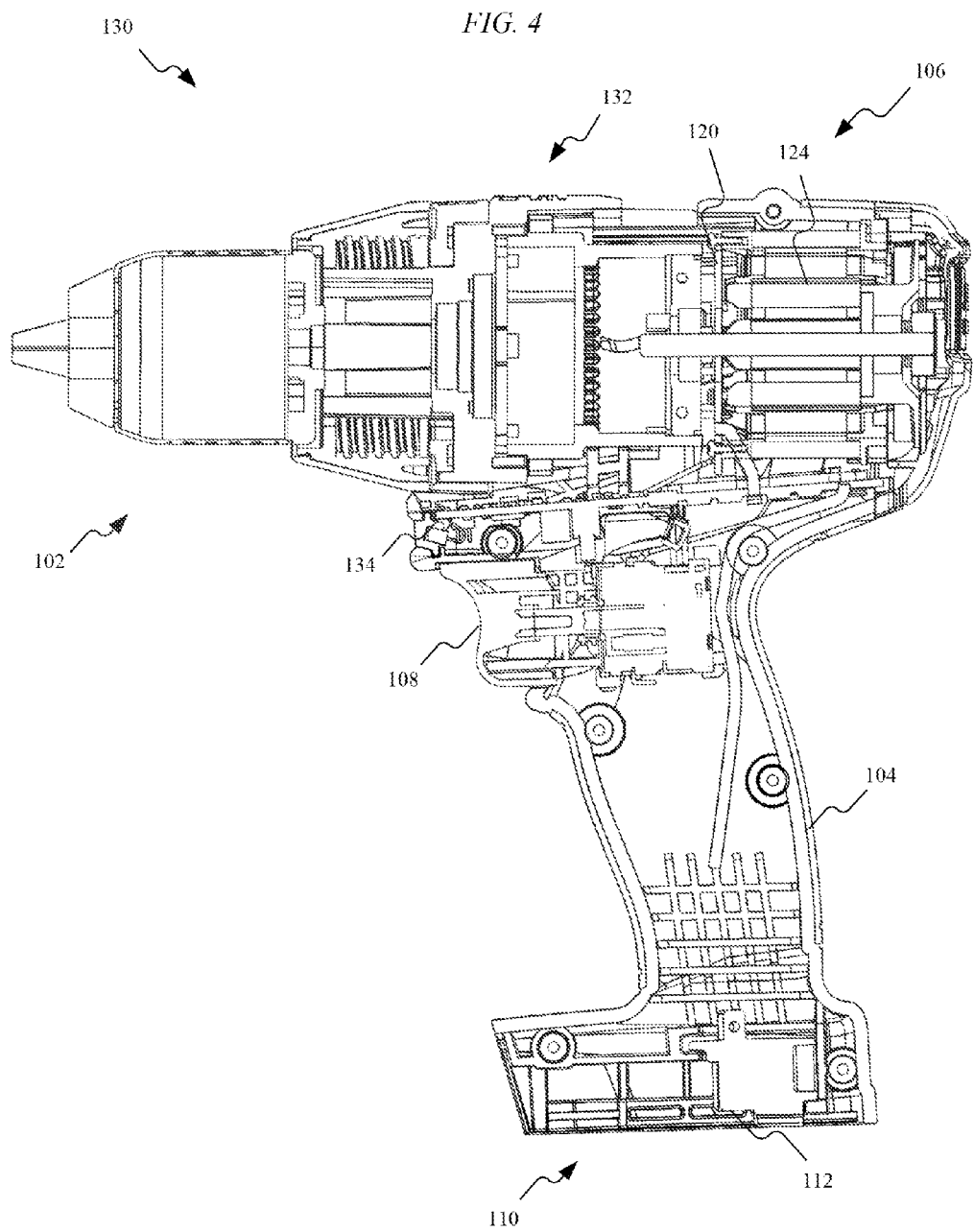
FIG. 4 is a cross-sectional view of the drill/driver of FIG. 3.

FIG. 3 illustrates a drill/driver 130 (herein a drill 130), and FIG. 4 illustrates a cross section thereof. Similar to the hammer drill 100, the drill 130 includes an output unit 102, handle 104, motor housing portion 106, trigger 108, and battery interface 110. Additionally, the drill 130 includes battery terminals 112, a Hall sensor PCB 120, and a motor 124 (e.g., a BLDC motor). In contrast to the hammer drill 100, however, the drill 130 does not include a drive mechanism for generating a hammering action. Rather, the rotational output of the motor 124 drives the output unit 102 with a gear system 132 that couples the motor 124 to the output unit 102. Additionally, the drill 130 includes a control and FET PCB 134 located above the trigger 108 but below the motor 124. The control and FET PCB 134 includes the components of both the control PCB 114 and the FET PCB 116 of the hammer drill 100. For example, the control and FET PCB 134 performs the control functions of the control PCB 114 and includes the switching circuits (FETs) of the FET PCB 116.

Figure 5:
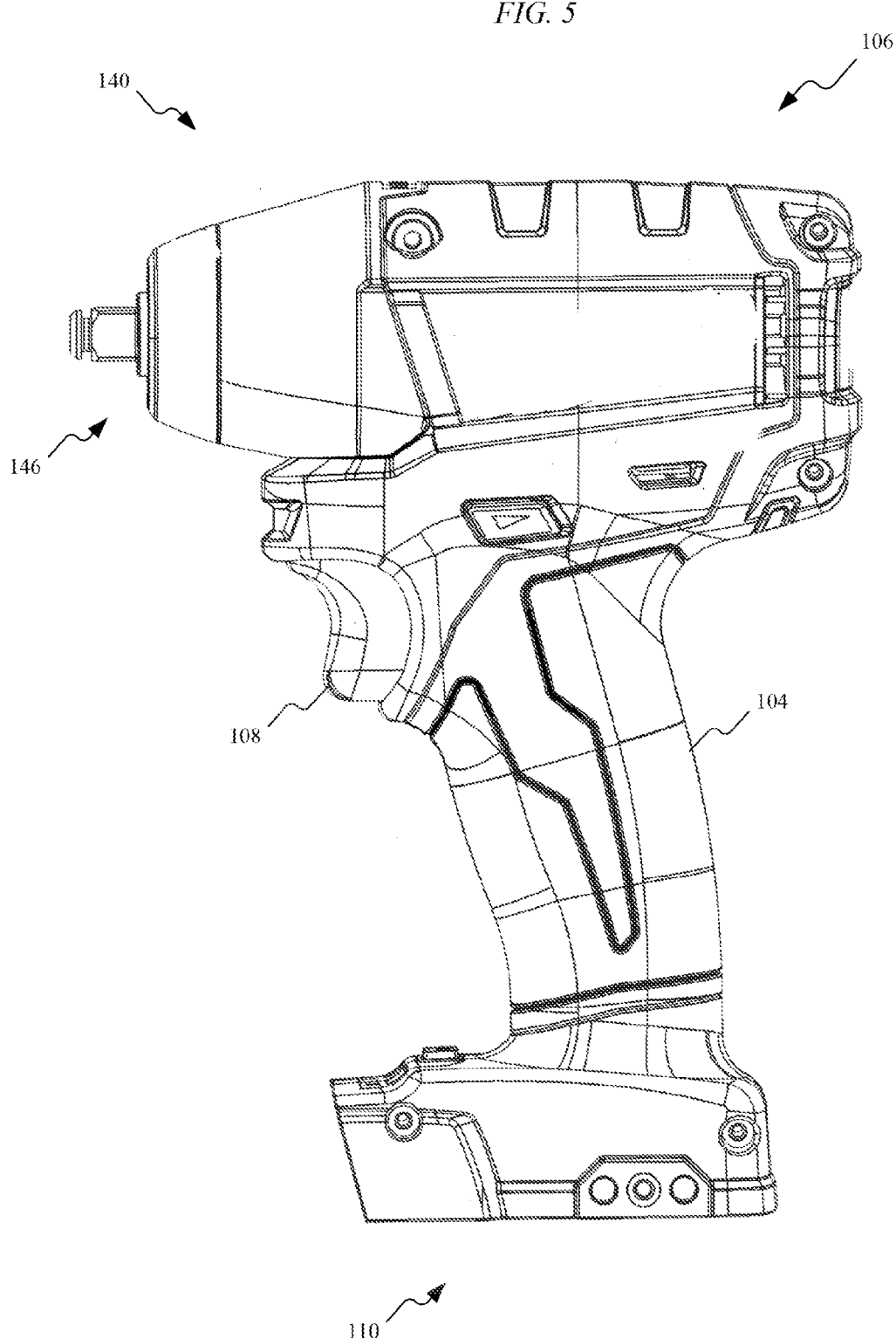
FIG. 5 illustrates an impact wrench according to an embodiment of the invention.
Figure 6:
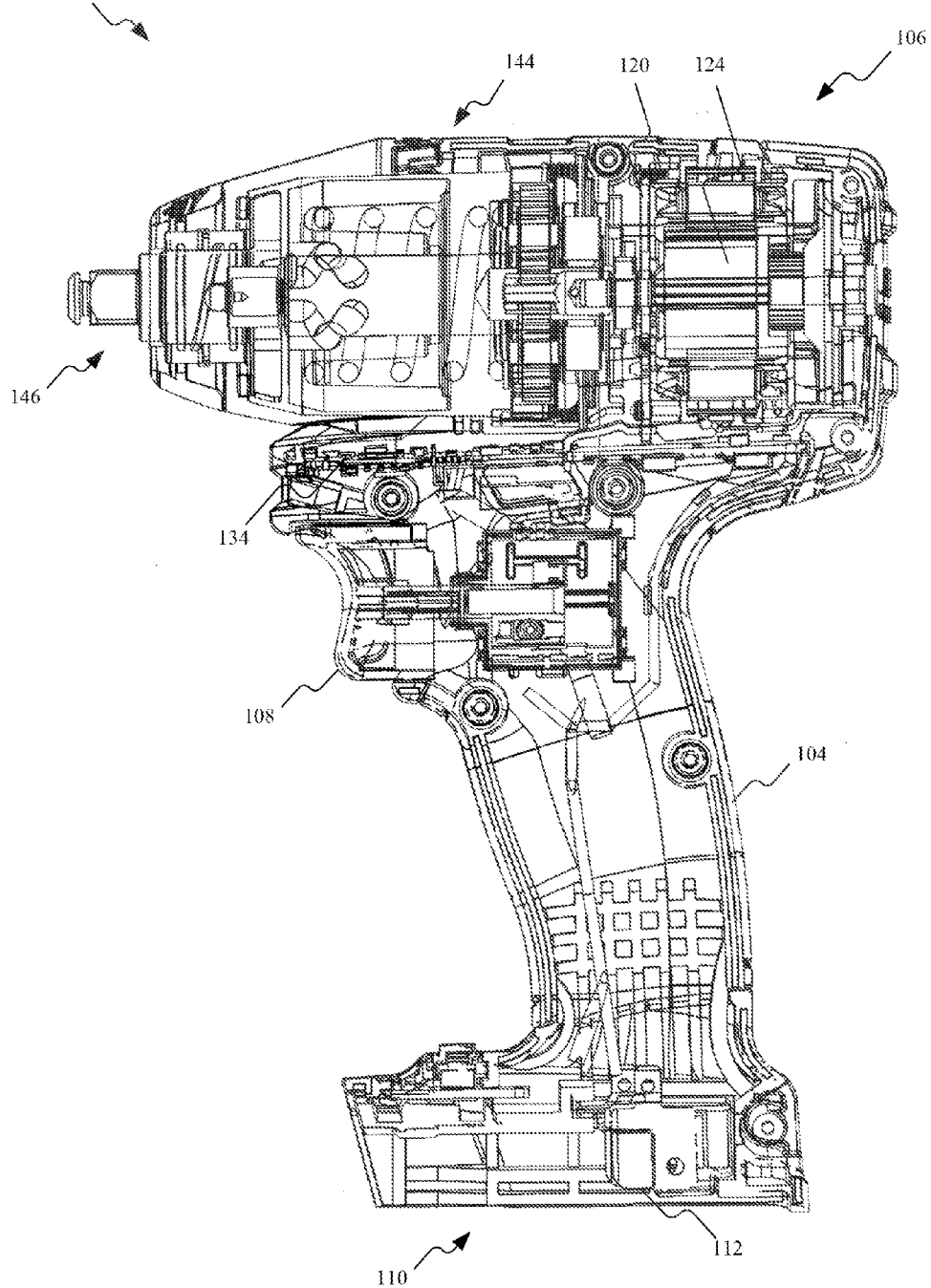
FIG. 6 is a cross-sectional view of the impact wrench of FIG. 5.

FIG. 5 illustrates an impact wrench 140, and FIG. 6 illustrates a cross section thereof. Similar to the hammer drill 100, the impact wrench 140 includes a handle 104, motor housing portion 106, trigger 108, battery interface 110, battery terminals 112, and a Hall sensor PCB 120. Like the drill 130, the impact wrench 140 includes a control and FET PCB 134 that performs the control functions of the control PCB 114 and includes the switching circuits (FETs) of the FET PCB 116 (both described above with respect to the hammer drill 100). Additionally, the impact wrench 140 includes an impact drive mechanism 144 that is driven by the motor 124 and that drives an output unit 146. For example, in some embodiments, the output unit 146 is a ½ inch drive adapter for receiving ½ inch sockets. In other embodiments, drive adapters of different sizes, such as ⅜ inch adapters, are used in some embodiments.

Figure 7:
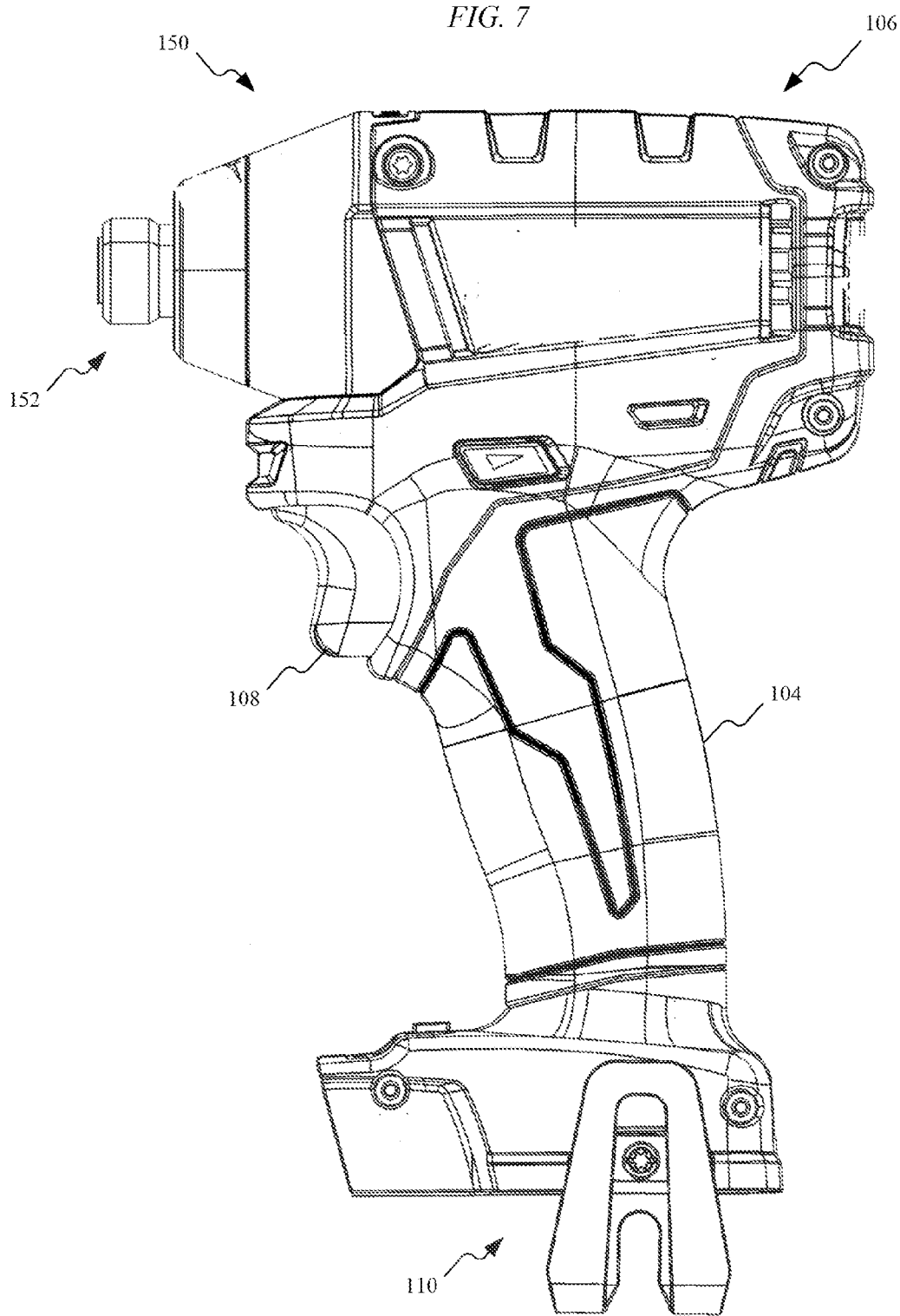
FIG. 7 illustrates an impact driver according to an embodiment of the invention.
Figure 8:
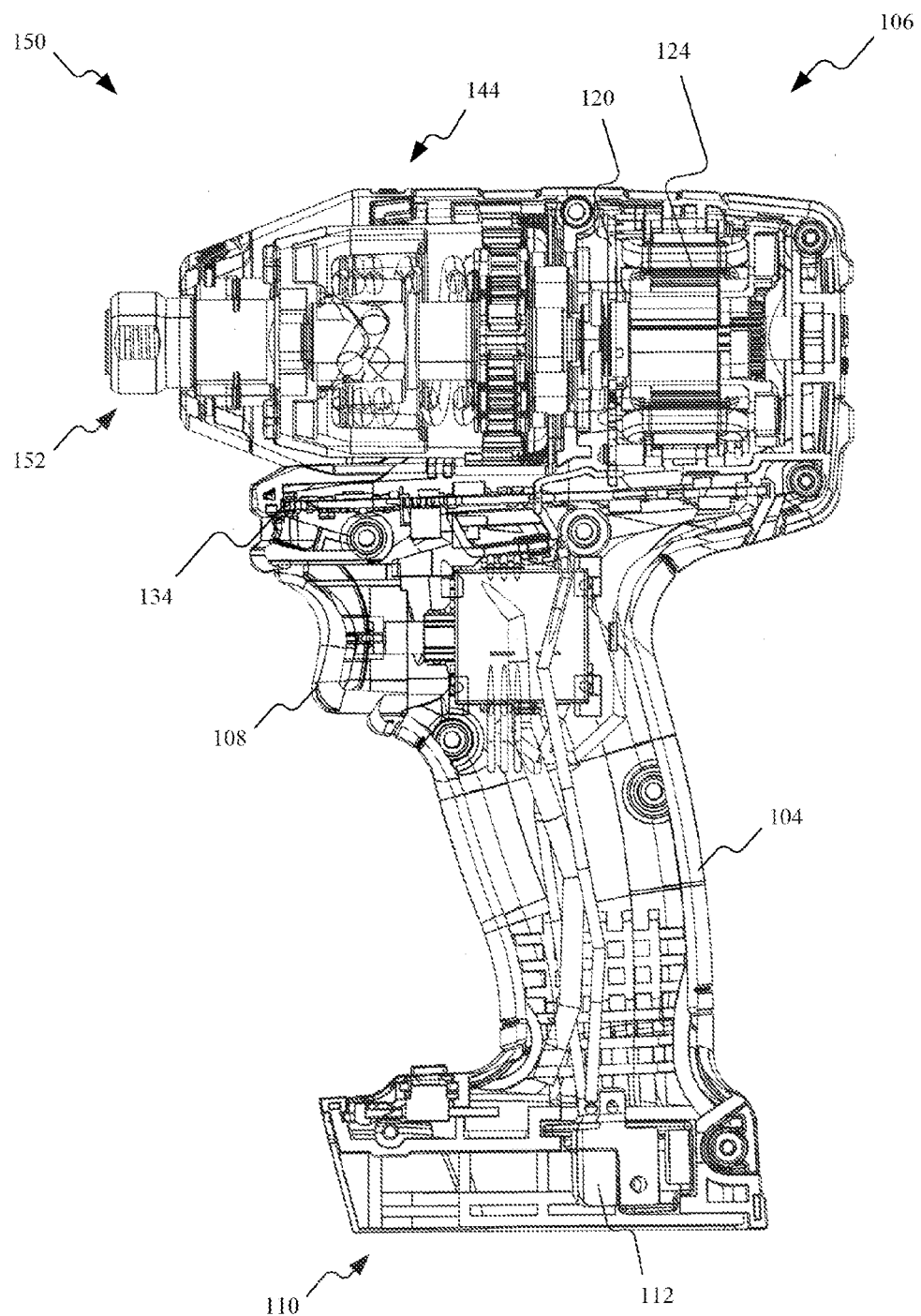
FIG. 8 is a cross-sectional view of the impact driver of FIG. 7.

FIG. 7 illustrates an impact driver 150, and FIG. 8 illustrates a cross section thereof. Similar to the impact wrench 140, the impact driver 150 includes a handle 104, a motor housing portion 106, a trigger 108, a battery interface 110, battery terminals 112, a Hall sensor PCB 120, a control and FET PCB 134, a drive mechanism 144 that is driven by the motor 124. The drive mechanism 144, however, drives an output unit 152, which is different than the output unit 146. In some embodiments, the output unit 152 is a ¼ inch hex chuck for receiving ¼" inch hex drivers. In other embodiments, output units with different chucks, such as ⅜ inch hex chucks, are used.

FIG. 9 illustrates a battery pack 126 for powering a power tool, such as the hammer drill 100, drill 130, impact wrench 140, and impact driver 150, as well as a plurality of other power tools and devices. The battery pack 126 includes an interface 154 with terminals 156 and rails 158, hooks 160, and release actuators 162. The interface 154 enables the battery pack 126 to be selectively engaged, mechanically and electrically, with the battery interface 110 of various power tools, such as the drill 100, drill 130, impact wrench 140, and impact driver 150. The battery pack 126 further includes a fuel gauge 164 for indicating to a user the state of charge of the battery cells within the battery pack 126. The battery pack 126 may include battery cells having a lithium-based chemistry.

Figure 10:
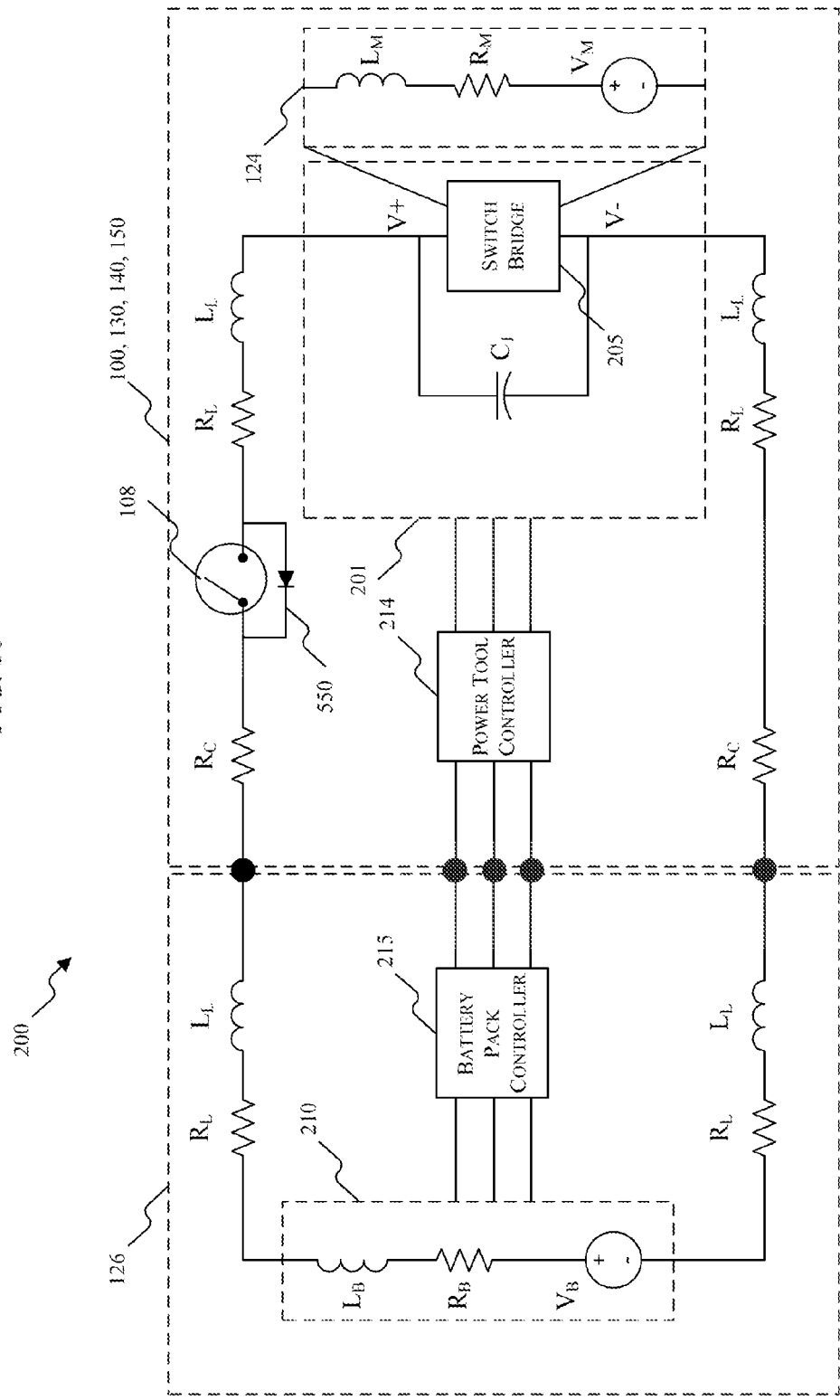
FIG. 10 is an electrical circuit diagram including a snubber circuit according to an embodiment of the invention.

FIG. 10 illustrates an electrical circuit 200 including a snubber circuit 201. The snubber circuit 201 may be implemented in any of the above-described hammer drill 100, drill 130, impact wrench 140, and impact driver 150, as well as a plurality of other power tools and devices.

As shown in FIG. 10, the power tool portion of the electrical circuit diagram includes the power tool controller 214 (e.g., the control PCB 114), a switch bridge 205, and the motor 124. The switch bridge 205 includes, for example, the FETs 118 described above, which are controlled by the power tool controller 214 to drive the motor 124.

As described above, the battery pack 126 selectively engages, mechanically and electrically, with the battery interface 110 of various power tools to provide power to the motor 124. The battery pack 126 includes a plurality of battery cells 210. As discussed above, in some embodiments, the battery cells 210 have a lithium-based chemistry.

The battery pack 126 also includes a battery pack controller 215. The battery pack controller 215 may be a microcontroller including a processor and memory. In some embodiments, the battery pack controller 215 is configured to monitor the voltages of the battery cells 210 and control the fuel gauge 162 of the battery pack 126 to indicate to a user the state of charge of battery cells 210 within the battery pack 126.

In some embodiments, the snubber circuit 201 is connected in a parallel-type configuration with the switch bridge 205. The phrase "parallel-type configuration" as used herein refers to a circuit arrangement where the described elements of the snubber circuit are arranged, in general, in a manner such that one element of the snubber circuit is connected to another element of the snubber circuit, such that the snubber circuit forms a parallel branch of the circuit arrangement. In such a configuration, the individual elements of the snubber circuit may not have the same potential difference across them individually as the switch bridge. For example, in a parallel-type configuration of the snubber circuit it is possible for two snubber circuit elements that are in parallel with one another to be connected in series with one or more additional elements of the snubber circuit. Therefore, a snubber circuit in a "parallel-type configuration" can include elements that do not necessarily individually form a true parallel circuit with the switch bridge.

The snubber circuit 201 includes a capacitor C1. In some embodiments, the capacitor C1 is a low equivalent series resistance (ESR) capacitor and is placed across the switch bridge 205, such that the positive terminal of the switch bridge 205 is electrically connected to a positive terminal of capacitor C1, and a negative terminal of the switch bridge 205 is electrically connected to a negative terminal of capacitor C1. In other embodiments, the capacitor C1 is a high ESR capacitor or a tantalum capacitor. The capacitor C1 dissipates energy from the magnetic fields generated by the power tool. For example, in embodiments where the capacitor C1 is a low ESR capacitor, the capacitor C1 dissipates energy in a moderate frequency resonance between the capacitor and the unclamped inductance. In embodiments where the capacitor C1 is a high ESR capacitor, the capacitor C1 stores (e.g., absorbs), or dissipates more slowly, the energy from the magnetic fields generated by the power tool. Once the trigger 108 is released and the motor 124 is deactivated, the capacitor C1 releases the stored energy back to the motor 124 and the battery pack 126 over a period of time (e.g., not instantaneously).

Additionally, in practice, the illustrated circuit 200 is not a pure capacitive circuit. Rather, it is an LC circuit which rings or resonates with a characteristic frequency equivalent to a capacitance value C value in parallel with all of the unclamped inductances (i.e., all non-motor inductances added up). This ringing causes voltages to have both positive and negative values. The negative voltages cause problems for various electronic ICs, and ring with a frequency typically between approximately 20 KHZ and approximately 60 KHZ, and very high power levels. This characteristic ringing frequency can also be used to infer the inductance of the battery pack 126. For example, the ringing frequency can be used to solve for the inductance L in the LC circuit because the capacitance is known. The identified inductance can, in-turn be used to identify the battery pack.

Figure 11:
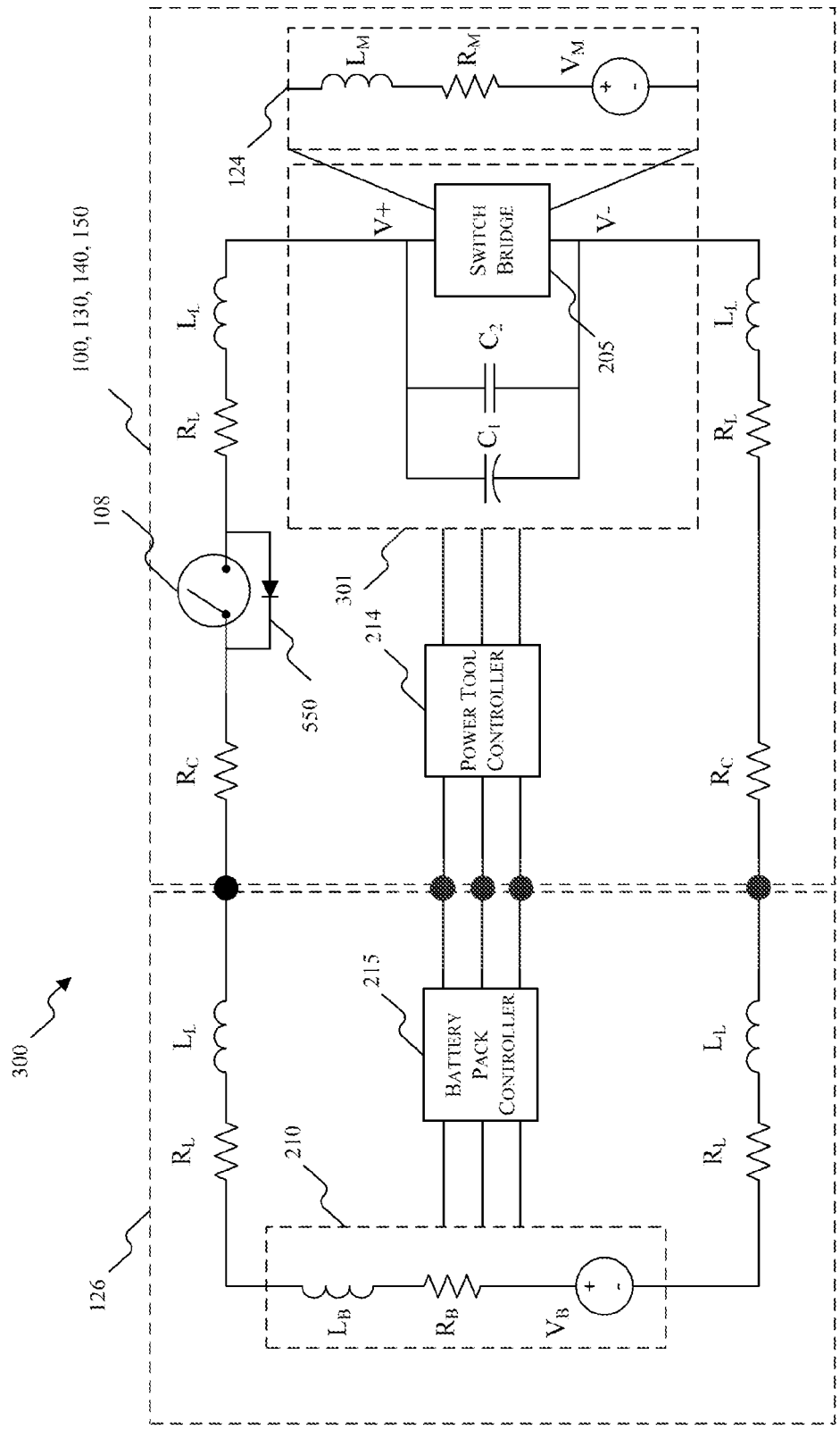
FIG. 11 is an electrical circuit diagram including a snubber circuit according to another embodiment of the invention.

FIG. 11 illustrates an electrical circuit 300 including a snubber circuit 301. The snubber circuit 301 includes a capacitor C1, which is also used in the snubber circuit 201 of FIG. 10. The snubber circuit 301 further includes capacitor C2, which is in a parallel connection with the capacitor C1. In the electrical circuit 300, the positive terminal of the switch bridge 205 is electrically connected to positive terminals of capacitors C1 and C2, while the negative terminal of the switch bridge 205 is electrically connected to negative terminals of capacitors C1 and C2. In some embodiments, the capacitor C2 is, for example, a low ESR capacitor, a high ESR electrolytic capacitor, a tantalum capacitor, etc. The energy from the magnetic fields within the power tool is spread across both capacitors C1 and C2. Once the trigger 108 is released and the motor 124 is deactivated, the capacitors C1 and C2 release the stored energy back to the motor 124 and the battery pack 126 over a period of time (e.g., not instantaneously). In one embodiment, capacitor C1 is a low ESR capacitor while capacitor C2 is a high ESR capacitor, or vice versa. Capacitor C1 and capacitor C2 having different ESR values results in capacitor C1 and capacitor C2 having difference charge/discharge rates. These different discharge rates result in the snubber circuit 301 with a low frequency band. In some embodiments, capacitor C1 is a non-polarized capacitor, and capacitor C2 is a polarized electrolytic capacitor. This allows the snubber circuit 301 to quickly store energy, but dissipate the energy slowly (e.g., over a longer time period than it took to charge) to return useful energy to the motor circuit.

Figure 12:
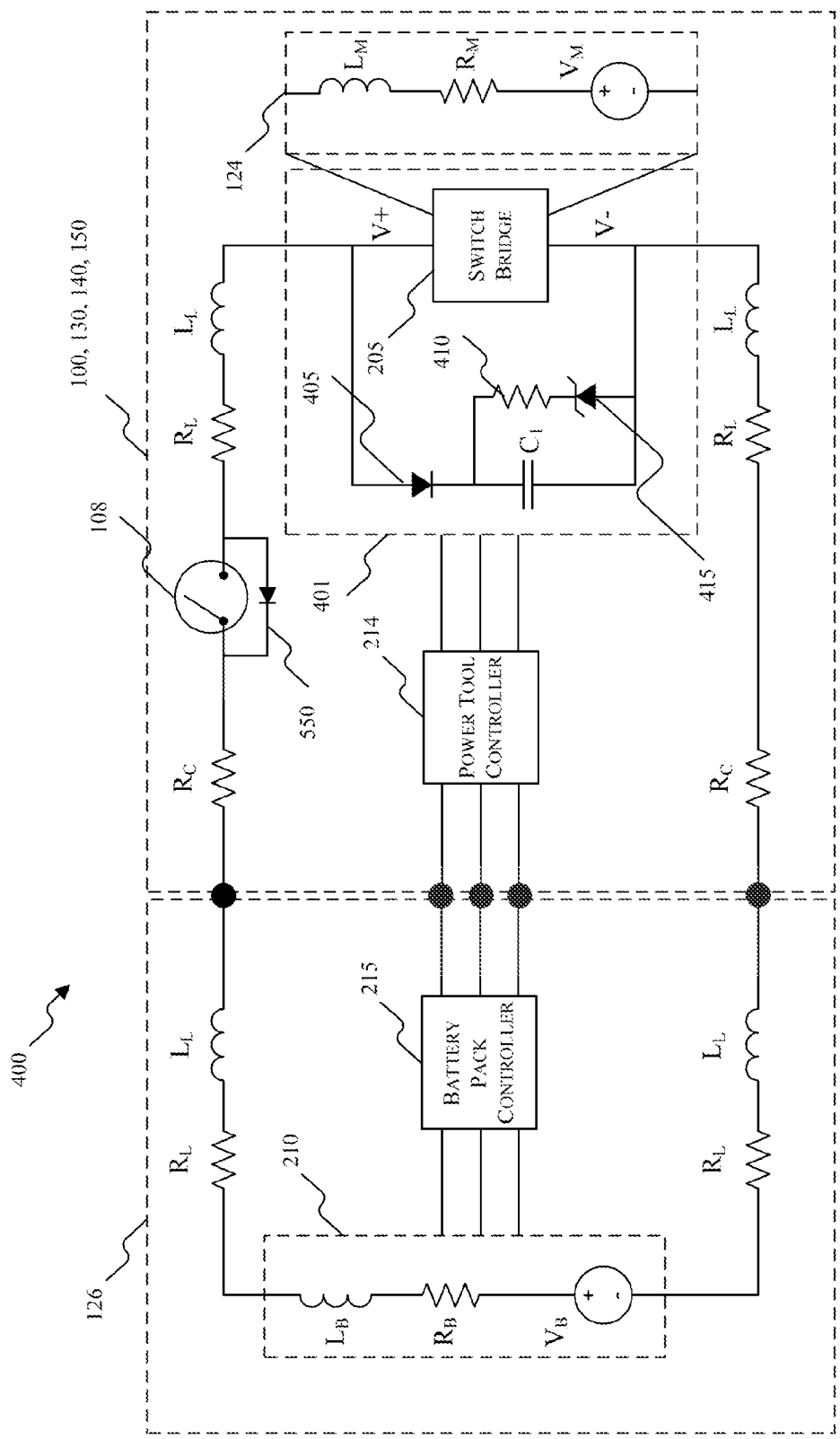
FIG. 12 is an electrical circuit diagram including a snubber circuit according to another embodiment of the invention.

FIG. 12 illustrates an electrical circuit 400 including a snubber circuit 401. The snubber circuit 401 includes a capacitor C1, a high power diode 405, a resistor 410, and a Zener diode 415. In the electrical circuit 400, the positive terminal of the switch bridge 205 is electrically connected to a positive terminal (i.e., anode) of the high power diode 405. A negative terminal (i.e., cathode) of the high power diode 405 is electrically connected to a positive terminal of capacitor C1 and a positive terminal of resistor 410. A negative terminal of resistor 410 is electrically connected to a negative terminal (i.e., cathode) of the Zener diode 415. A negative terminal of capacitor C1 is electrically connected to a positive terminal (i.e., anode) of the Zener diode 415. A negative terminal of the capacitor C1 and a positive terminal (i.e., anode) of the Zener diode 415 are further electrically connected to the negative terminal of the switch bridge 205.

In operation, the high power diode 405 allows energy to flow into capacitor C1, but does not allow the bus voltage to ring (as described above) because the capacitor C1 is isolated from the unclamped inductance. The energy stored in C1 is dissipated by the resistor 410. The Zener diode 415 prevents the resistor 410 from continually dissipating energy from the capacitor C1. This is achieved by implementing a Zener diode 415 having a breakdown voltage approximately equal to but slightly greater than the power tool bus voltage. As a result, the Zener diode 415 is only active, and thus allowing the resistor 410 to dissipate energy stored in C1, when there is excess energy stored in capacitor C1.

Figure 13:
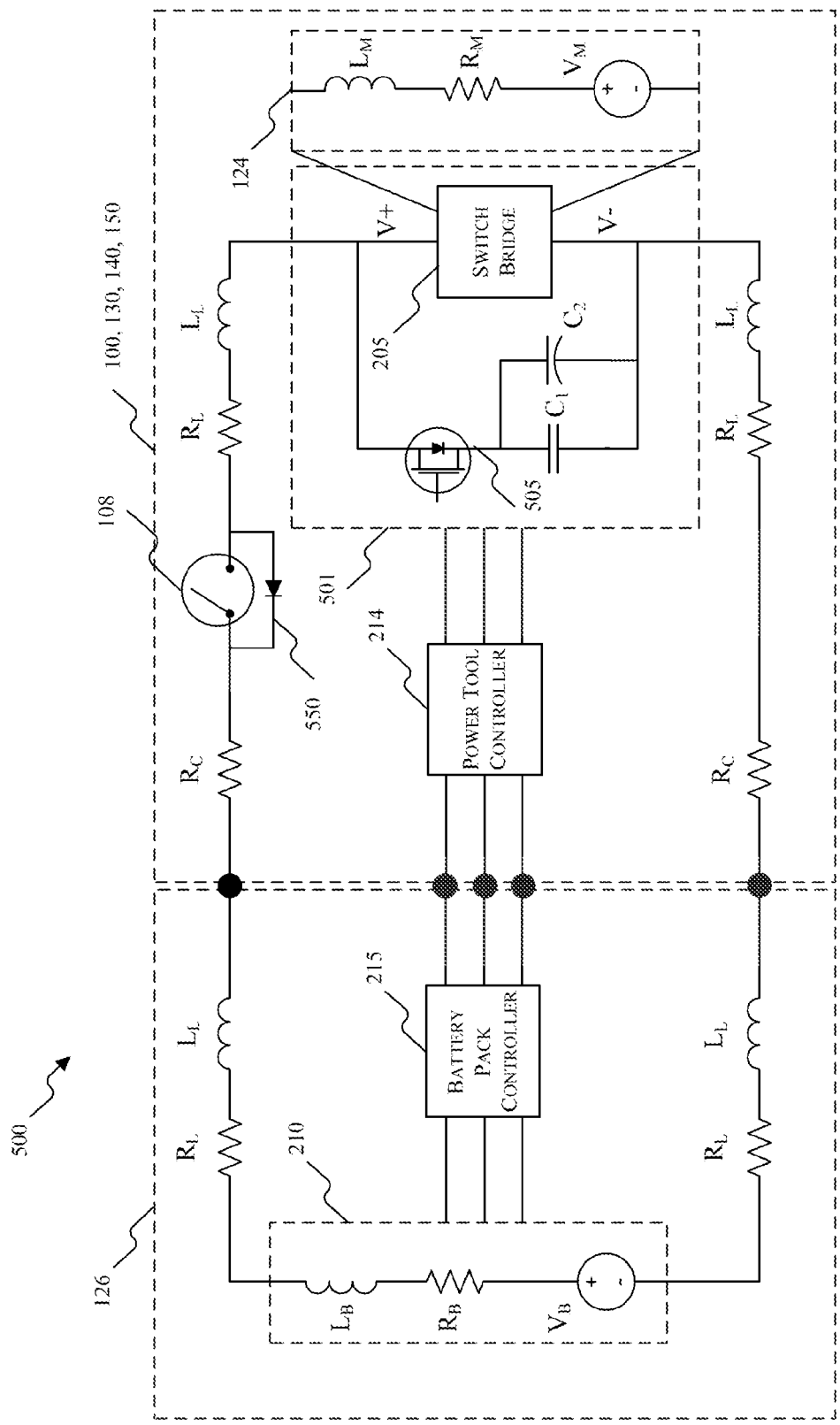
FIG. 13 is an electrical circuit diagram including a snubber circuit according to another embodiment of the invention.

FIG. 13 illustrates an electrical circuit 500 including a snubber circuit 501. The snubber circuit 501 includes the capacitor C1 and the capacitor C2 connected in parallel, and a switch, or FET, 505 (e.g. a MOSFET). In the electrical circuit 500, the positive terminal of the switch bridge 205 is electrically connected to a first terminal (e.g., a source of a p-channel MOSFET, a drain of an n-channel MOSFET, etc.) of the FET 505. A second terminal (e.g., a drain of a p-channel MOSFET, a source of an n-channel MOSFET, etc.) of the FET 505 is electrically connected to positive terminals of capacitors C1 and C2. Negative terminals of capacitors C1 and C2 are electrically connected to the negative terminal of the switch bridge 205.

In operation, the capacitors C1 and C2 store energy until FET 505 is turned on by the power tool controller 214. Once the FET 505 is turned on, the energy stored by the capacitors C1 and C2 is dissipated. The capacitors C1 and C2 are, for example, low ESR capacitors, high ESR capacitors, tantalum capacitors, or a combination of such capacitors. In some embodiments, the FET 505 can be controlled by the power tool controller 214 to control the speed or rate at which energy from the capacitors is released. In such an embodiment, the gate of the FET 505 is electrically connected to an output of the controller 214. The snubber circuit 501 allows for recovery of the unclamped energy by storing the energy passing through the body diode of FET 505, and then returning the stored energy to the motor during later cycles.

As discussed above, in contrast to the "unclamped" inductance, the inductance of the motor 124 is "clamped" because of the diodes placed around the motor 124 as part of the switch bridge 205. The energy from the inductance of the motor 124 is usually dissipated within the switch bridge 205. However, under certain circumstances, the FETs 118 of the switch bridge 205 need to be shutdown. When the FETs 118 are shutdown, the current in the motor 124 causes a voltage pulse which is directed upward in the switch bridge 205, and then into the snubber circuits 200, 300, 400, 500. This voltage pulse is normally too large for the capacitors of the snubber circuits 200, 300, 400, 500 to handle. However, the battery cells 210 of the battery pack 126 can be used as a large capacitor to absorb this energy. Therefore, as shown in FIGS. 10-13, the power tool can further include a diode 550 placed across the trigger 108. When the trigger 108 is activated, energy flows from the battery cells 210 of the battery pack 126, through the trigger 108, to the motor 124, thus powering the motor 124. Once the trigger 108 is deactivated, the energy path from the battery cells 210 to the motor 124 is broken. However, because of the diode 550, the pulse of energy from the motor 124 is allowed to flow back into the battery cells 210, which as discussed above, act as a large capacitor to store the energy.

Thus, the invention provides, among other things, a snubber circuit for a power tool that includes a motor (e.g., a brushless direct current ["BLDC"]).

What is claimed is:

1. A hand held power tool comprising:
    a trigger;
    a motor;
    an output unit driven by the motor;
    a switch bridge operable to selectively provide power to the motor to drive the output unit in response to activation of the trigger; and
    a snubber circuit electrically connected in parallel across the switch bridge, the snubber circuit operable to store energy when power is being provided to the motor and release the energy when power is not being provided to the motor.

2. The hand held power tool of claim 1, wherein the energy is released from the snubber circuit into one of the switch bridge and the motor.

3. The hand held power tool of claim 1, wherein the motor is a brushless direct-current motor.

4. The hand held power tool of claim 1, wherein the snubber circuit includes a capacitor operable to store energy.

5. The hand held power tool of claim 4, wherein the snubber circuit further includes a switch, the switch configured to release the energy stored in the capacitor upon activation of the switch.

6. The hand held power tool of claim 5, further comprising a controller, and wherein the switch is controlled by the controller.

7. The hand held power tool of claim 5, wherein
    a positive terminal of the switch bridge is electrically connected to a first terminal of the switch,
    a second terminal of the switch is electrically connected to a positive terminal of the capacitor, and
    a negative terminal of the capacitor is electrically connected to a negative terminal of the switch bridge.

8. The hand held power tool of claim 1, further comprising a battery receptacle operable to receive a battery pack.

9. The hand held power tool of claim 8, wherein the battery pack receives the energy released from the snubber circuit.

10. The hand held power tool of claim 1, wherein the snubber circuit includes a capacitor, a diode, a resistor, and a Zener diode.

11. The hand held power tool of claim 10, wherein
    a positive terminal of the switch bridge is electrically connected to an anode of the diode,
    a cathode of the diode is electrically connected to a positive terminal of the capacitor and a positive terminal of the resistor,
    a negative terminal of the resistor is electrically connected to a cathode of the Zener diode, and
    an anode of the Zener diode is electrically connected to a negative terminal of the capacitor and a negative terminal of the switch bridge.

12. A hand held power tool comprising:
    a motor;
    an output unit driven by the motor;
    a switch bridge operable to selectively provide power to the motor; and
    a snubber circuit electrically connected to the switch bridge in a parallel-type configuration, the snubber circuit including a capacitor configured to store magnetic-field energy when power is being provided to the motor and release the magnetic-field energy when power is not being provided to the motor.

13. The hand held power tool of claim 12, wherein the energy is released from the snubber circuit into one of the switch bridge and the motor.

14. The hand held power tool of claim 12, further comprising
    a user-activated switch; and
    a controller electrically connected to the user-activated switch, the controller configured to control the switch bridge upon activation of the user-activated switch.

15. The hand held power tool of claim 14, further comprising a switch electrically connected in series with the capacitor.

16. The hand held power tool of claim 15, wherein
    the switch is configured to release the magnetic-field energy stored in the capacitor upon activation of the switch, and
    wherein the controller is further configured to activate the switch.

17. The hand held power tool of claim 16, wherein
    a positive terminal of the switch bridge is electrically connected to a first terminal of the switch,
    a second terminal of the switch is electrically connected to a positive terminal of the capacitor, and
    a negative terminal of the capacitor is electrically connected to a negative terminal of the switch bridge.

18. The hand held power tool of claim 12, wherein the snubber circuit further includes a diode electrically connected in series with the capacitor.

19. The hand held power tool of claim 12, further comprising a battery receptacle configured to receive a battery pack.

20. The hand held power tool of claim 19, wherein the battery pack receives the energy released from the snubber circuit.

21. The hand held power tool of claim 12, wherein the snubber circuit further includes a diode, a resistor, and a Zener diode.

22. The hand held power tool of claim 21, wherein
    a positive terminal of the switch bridge is electrically connected to an anode of the diode, a cathode of the diode is electrically connected to a positive terminal of the capacitor and a positive terminal of the resistor, a negative terminal of the resistor is electrically connected to a cathode of the Zener diode, and an anode of the Zener diode is electrically connected to a negative terminal of the capacitor and a negative terminal of the switch bridge.

23. A method for controlling unclamped inductance in a power tool including a motor, an output unit driven by the motor, a switch bridge, and a snubber circuit, the method comprising:

receiving power at the switch bridge;

selectively providing power to the motor;

storing energy in the snubber circuit when power is being provided to the motor; and releasing the energy stored in the scrubber circuit when power is not being provided to the motor.

24. The method of claim 23 wherein the energy is a magnetic-field energy.

25. The method of claim 23 wherein the energy is released from the snubber circuit into one of the switch bridge and the motor.

\* \* \* \* \*